United States Patent [19]
Watanabe et al.

[11] Patent Number: 5,504,601
[45] Date of Patent: Apr. 2, 1996

[54] LIQUID CRYSTAL DISPALY APPARATUS WITH GAP ADJUSTING LAYERS LOCATED BETWEEN THE DISPLAY REGION AND DRIVER CIRCUITS

[75] Inventors: Yoshihiro Watanabe, Yokohama; Hiroki Nakamura, Chigasaki; Takako Sugawara, Kawasaki, all of Japan

[73] Assignee: Kabushiki Kaisha Toshiba, Kawasaki, Japan

[21] Appl. No.: 196,215

[22] PCT Filed: Jul. 14, 1993

[86] PCT No.: PCT/JP93/00975

§ 371 Date: Jul. 13, 1994

§ 102(e) Date: Jul. 13, 1994

[87] PCT Pub. No.: WO94/02880

PCT Pub. Date: Mar. 2, 1994

[30] Foreign Application Priority Data

Jul. 15, 1992 [JP] Japan .................. 4-187908

[51] Int. Cl.⁶ .................. G02F 1/1343; G02F 1/1339
[52] U.S. Cl. .................. 359/59; 359/80; 359/81
[58] Field of Search .................. 359/81, 82, 83, 359/59, 80

[56] References Cited

U.S. PATENT DOCUMENTS

| | | | |
|---|---|---|---|
| 3,863,332 | 2/1975 | Leupp et al. | 359/87 |
| 3,978,580 | 9/1976 | Leupp et al. | 359/81 |
| 4,231,034 | 10/1980 | Bechteler | 359/81 |
| 4,448,491 | 5/1984 | Okubo | 359/81 |
| 4,653,864 | 3/1987 | Baron et al. | 359/81 |
| 4,744,639 | 5/1988 | Tsuboyama | 359/81 |
| 4,842,377 | 6/1989 | Nakanowatari | 359/81 |
| 5,181,132 | 1/1993 | Shindo et al. | 359/81 |
| 5,193,021 | 3/1993 | Kim | 359/81 |

FOREIGN PATENT DOCUMENTS

| | | | |
|---|---|---|---|
| 1267518 | 10/1989 | Japan . | |
| 2-220032 | 9/1990 | Japan | 359/81 |

OTHER PUBLICATIONS

Patent Abstract of Japan, vol. 14, No. 565 (P–1143), Dec. 17, 1990, JP 2 242 230, Sep. 26, 1990.

IBM Technical Disclosure Bulletin, vol. 34, No. 4B, pp. 90–92, "Flat Cell Structure For Active Matrix LCD", Sep. 1991.

*Primary Examiner*—Anita Pellman Gross
*Assistant Examiner*—Walter J. Malinowski
*Attorney, Agent, or Firm*—Oblon, Spivak, McClelland, Maier & Neustadt

[57] ABSTRACT

An object is to provide a liquid crystal display apparatus with an equal gap between two substrates so as to improve display image quality and display contrast. To accomplish this object, substrate gap adjusting region 33 or substrate gap adjusting layers 21, 22, 25, 27, 29, and 31 are formed so that the substrate gap in a region extending from a display region having pixel electrodes 7 to a driver circuit 11 is kept equal to the substrate gap in a region extending from the display region to a driver circuit 15. Thus, the gap between the two opposed substrates forming liquid crystal cells can be kept equal in any position.

8 Claims, 10 Drawing Sheets

LIQUID CRYSTAL DISPALY APPARATUS WITH GAP ADJUSTING LAYERS LOCATED BETWEEN THE DISPLAY REGION AND DRIVER CIRCUITS

TECHNICAL FIELD

The present invention relates to a liquid crystal display apparatus, in particular, to a liquid crystal display apparatus having two substrates bonded with an equal gap.

BACKGROUND ART

In recent years, so as to speed up image processing of liquid crystal display apparatuses and improve display image quality, so-called active matrix type liquid crystal display apparatuses where switching thin film transistors (hereinafter referred to as TFTs) are disposed corresponding to display picture elements (pixels) have been developed.

Switching TFTs that contain amorphous silicon (a-Si) or poly silicon (poly-Si) have been widely used for such active matrix type liquid crystal display apparatuses.

In particular, poly-Si TFTs have high mobility and is incorporated as driver circuits with switching TFTs corresponding to pixels on the same substrate from the process coordination point of view. Thus, it is known that poly-Si is a constructional material of TFTs suitable for active matrix type liquid crystal display apparatuses, which should be small and have precise display characteristics.

Next, a construction of a switching element array substrate for use in a conventional active matrix type liquid crystal display apparatus will be described in brief. FIG. 9 is a plan view showing a switching element array substrate. FIG. 10 is a sectional view (taken along line A–A' of FIG. 9) chiefly showing signal lines of a portion covered with a sealing member. FIG. 11 is a sectional view (taken along line B–B' of FIG. 9) chiefly showing scanning lines of a portion covered with the sealing member. For simplicity, FIG. 9 shows only nine pixels in the display region of a liquid crystal display panel. In addition to constructional elements shown in FIG. 9, storage capacitors Cs, storage capacitor lines coupled thereto, and the like are formed on a TFT substrate. For simplicity, these capacitors, lines, and the like are omitted.

As shown in FIG. 9, TFTs 503 that are used as switching elements of a pixel portion each are formed on a switching element array substrate 501 of the liquid crystal display apparatus. A drain of each TFT 503 is connected to a signal line 505. A source of each TFT 503 is connected to a pixel electrode 507. A gate of each TFT 503 is connected to a scanning line 509.

The signal line 505 extends outside a display region through a sealing member 511 and is connected to signal line driver circuits 513. The scanning line 509 extends outside the display region through the sealing member 511 and is connected to scanning line driver circuits 515.

As shown in FIG. 10, which is a sectional view taken along line A–A' of FIG. 9, the layer insulating film 601, the signal line 505, and the protecting film 603 are layered on the glass substrate 600. The layer insulating film 601 is made of for example $SiO_x$. The signal line 505 is formed by patterning a Al/Cr film on the glass substrate 600.

On the other hand, as shown in FIG. 11, which is a sectional view taken along line B–B' of FIG. 9, the scanning line 509 is formed by patterning a poly-silicon film on the glass substrate 600. Since the poly-silicon film contains impurities, the resistance of the poly-silicon film is low.

The switching element array substrate 501 and an opposed substrate (not shown) are positioned face to face. The opposed substrate has a counter electrode and aligning film. The counter electrode is made of ITO. The sealing member (that serves both as a sealing member and a bonding agent) 511 is printed or coated with a predetermined width over the signal lines 505 that extend between the signal line driver circuits 513 and the display region, and over the scanning lines 509 that extend between the scanning line driver circuits 515 and the display region. Both of the substrates are facing each other with a gap and bonded with pressing so that the aligning directions of the aligning films of the substrates are perpendicular to each other. A cavity liquid crystal cell defined by the gap between the two substrates and the sealing member is filled with a liquid crystal composition (not shown) that serves as an optical modulating layer. In this manner, a liquid crystal display apparatus is formed.

The sealing member 511, which bonds the above-mentioned two substrates, is formed by mixing a spacer with a bonding agent. The spacer is made of for example a gap controlling member with the same diameter and length as the gap to be kept for substrates. For example, the spacer is made of needle-like glass fibers with a diameter of 5 μm and a length of 20 μm to 200 μm. The sealing member is printed or coated over the above-mentioned region so as to keep the gap between the two substrates equal.

However, at the portion of each signal line 505, since the layer insulating film (0.45 μm), the Al/Cr dual layer (0.8 μm/0.05 μm) and the protecting film (0.3 μm) are formed, the thickness measured from the front surface of the substrate 600 covered with the sealing member 511 of the switching element array substrate 501 to the protecting film 603 (namely, the gap between the substrates) is 1.6 μm. On the other hand, at the portion of the scanning line 509, since the poly-silicon film (0.4 μm), the layer insulating film (0.45 μm), and the protecting film (0.3 μm) are formed, the thickness measured from the front surface of the substrate 600 covered with the sealing member 511 of the switching element array substrate 501 to the protecting film 603 is 1.15 μm. The difference of thickness of these portions is 1.6 μm−1.15 μm=0.45 μm. In other words, the difference of gaps of the substrates held by the sealing member 511 is approximately as many as 10% of 5 μm that is the gap between the substrates. The difference of thicknesses of the sealing member 511 at the two portions results in deviation on a screen formed by the gap between the two substrates. Thus, a display image on the screen (display region) becomes uneven. In particular, the substrate gap in the vertical direction of the screen does not match the substrate gap in the horizontal direction of the screen. Thus, the two substrates are not positioned in parallel with each other. Therefore, an uneven display image takes place.

As described above, the difference between the height of the sealing member over the scanning lines 509 and the height of the sealing member over the signal lines 505 results from the difference of layer construction and difference of film thickness. However, to form TFTs, the layer construction of the scanning lines 509 should be different from the layer construction of the signal lines 505. In other words, a layer on which the scanning lines 509 are formed is different from a layer on which the signal lines 505 are formed. The layer of the scanning lines 509 and the layer of the signal lines 505 are insulated by a layer insulating film 601 or the like. In each TFT 503, the gate (or gate electrode)

is connected to the scanning line 509. The drain (or drain electrode) is connected to the signal line 505. The gate and drain of the TFT 503 are formed on different layers through a semiconductor layer. The process conditions for these layers are remarkably different from each other regardless of whether the gate electrode is disposed over the semiconductor layer (namely, stagger construction) or below the semiconductor layer (namely, antistagger construction). Thus, the scanning lines 509 and the signal lines 505 should be formed on different layers with different thicknesses. The thickness of the portion of the scanning lines 509 on which the sealing member is formed is necessarily different from the thickness of the portion of the signal lines 505 on which the sealing member is formed. In addition, the thicknesses of these portions vary in their fabrication processes.

The length of the glass fibers is around 20 μm to 200 μm and the end surfaces thereof are sharp. Thus, when the glass fibers are positioned over the signal lines 505 and the scanning lines 509 and bonded thereto with pressing, the glass fibers occasionally damage the signal lines 505 and the scanning lines 509.

To obtain a high quality display image, color and contrast should be improved. The uneven colors take place due to coherence of light through liquid crystal display panel because of unequal gap between two substrates of the panel. In addition, difference of electric fields applied to liquid crystal composition and difference of retardation result in uneven contrast and uneven colors. To obtain a gray scale display image and a high resolution display image, a liquid crystal composition that has a quick voltage-response characteristic is used. The light transmittivity of a liquid crystal composition with a quick voltage-response characteristic largely varies as the retardation varies. Thus, when the gap between the substrates is uneven, the retardation largely varies, thereby remarkably lowering the evenness of intensity of display image, position by position. In particular, in the case of a projection type liquid crystal display apparatus with three liquid crystal display devices, such a problem becomes important.

For a display image quality of such a liquid crystal apparatus, in reality, the deviation of gap between two substrates should be decreased to around 0.1 μm or less. To accomplish high quality display image, factors that cause an image to be uneven other than errors in fabrication process should be removed.

As described above, since the substrate gap at the portion where the scanning lines are covered with the sealing member (namely, the thickness measured from the front surface of the substrate to the upper surface of the protecting film over the scanning lines) differs from the substrate gap at the portion where the signal lines are covered with the sealing member (thickness measured from the front surface of the substrate to the upper surface of the protecting film over the signal lines), uneven colors, uneven contrast, and so forth take place in a display image, thereby deteriorating display image characteristics.

The present invention has been made to solve such problems. An object of the present invention is to provide a liquid crystal display apparatus with an equal gap between two substrates so as to improve display image quality and display image contrast.

DISCLOSURE OF INVENTION

A liquid crystal display apparatus according to the present invention, comprising a switching element array substrate having switching elements, scanning lines, signal lines, and pixel electrodes, the scanning lines and the signal lines being coupled to the switching elements, the pixel elements being coupled to the switching elements, a scanning line driver circuit coupled to the scanning lines, a signal line driver circuit coupled to the signal lines, an opposed substrate having a counter electrode, the counter electrode being arranged opposite to the pixel electrodes with a gap so in order to define a display region, the opposed substrate being bonded to the switching element array substrate with a sealing member formed in a sealing region around the display region, and an optical modulating layer formed at the gap between the switching element array substrate and the opposed substrate and sealed with the sealing member, wherein a substrate gap adjusting region is disposed on at least one region of a first region between the display region and the scanning line driver circuit and a second region between the display region and the signal line driver circuit so as to adjust a first gap between the first region of the switching element array substrate and the opposed substrate to be equal a second gap between the second region of the switching element array substrate and the opposed substrate.

A liquid crystal display apparatus according to the present invention, comprising a switching element array substrate having switching elements, scanning lines, signal lines, and pixel electrodes, the scanning lines and the signal lines being coupled to the switching elements, the pixel elements being coupled to the switching elements, a scanning line driver circuit coupled to the scanning lines, a signal line driver circuit coupled to the signal lines, an opposed substrate having a counter electrode, the counter electrode being arranged opposite to the pixel electrodes with a gap so in order to define a display region, the opposed substrate being bonded to the switching element array substrate with a sealing member formed in a sealing region around the display region, and an optical modulating layer formed at the gap between the switching element array substrate and the opposed substrate and sealed with the sealing member, wherein a substrate gap adjusting layer is disposed on at least one region of a first region between the display region and the scanning line driver circuit and a second region between the display region and the signal line driver circuit so as to adjust a first gap between the first region of the switching element array substrate and the opposed substrate to be equal a second gap between the second region of the switching element array substrate and the opposed substrate.

The above-mentioned substrate gap adjusting region or substrate gap adjusting layer may be any member that can keep the substrate gap at the regions that extend from the display region to each of the scanning line driver circuits and that are covered with the sealing member and the substrate gap at the regions that extend from the display region to each of the signal line driver circuits and that are covered with the sealing member to be even. For example, an organic material with high insulating characteristics is formed over the regions that are covered with the sealing member so that the substrate gap becomes equal. The sealing member that also serves as a bonding agent is thinly coated over the substrate so as to bond this substrate to the opposed substrate. Part of the circuit constructional elements of the liquid crystal driver circuits may be used as the substrate gap adjusting region or substrate gap adjusting layer. The lead-out lines of the scanning lines that connect the scanning line driver circuits and the lead-out lines of the signal lines that connect the signal line driver circuits may be formed as the substrate gap adjusting region or substrate gap adjusting layer. The height of the lead-out lines of the scanning lines should be equal to the height of the lead-out lines of the signal lines. The material of the scanning lines may be different from the material of the lead-out lines thereof. The material of the signal lines may be different from the material of the lead-out lines thereof. The material of the lead-out lines of the scanning lines and the signal lines may be different from the material of the scanning lines and the signal lines.

According to the liquid crystal display apparatus of the present invention, the substrate gap adjusting region or the substrate gap adjusting layer is formed over at least one of the scanning lines and the signal lines. The substrate gap adjusting layer may be patterned over the scanning lines and signal lines so that the layer is in parallel with or perpendicular to the lines. The substrate gap adjusting layer may be formed in a straight pattern or zigzag pattern. The substrate gap adjusting layer may be formed over or below the scanning lines and signal lines. In any case, when the substrate gap adjusting layer can keep the substrate gap at the regions extending the display region and each of the scanning line driver circuits and the substrate gap at the regions extending the display region and each of the signal line driver circuits to be equal, any layer sequence may be selected and any pattern may be used. And the substrate gap adjusting layer may be formed over the storage capacitor lines.

According to the liquid crystal display apparatus of the present invention, the substrate gap adjusting region or substrate gap adjusting layer is formed along the scanning lines and signal lines. For example, the substrate gap adjusting layer may be column shaped so that it does not interfere with the signal lines and scan lines. The substrate gap adjusting layer may be patterned in parallel with the scanning lines and signal lines so as not to connect to the lines. In addition to the scanning lines and signal lines, the substrate gap adjusting layer may be patterned in parallel with for example the storage capacitor lines.

According to the present invention, at least one of materials used for the liquid crystal display apparatus is preferably used for the substrate gap adjusting layer.

According to the present invention, the substrate gap adjusting layer that is formed at the regions extending from the display region and each of the scanning line driver circuits is formed on the same layer and with the same material as the signal lines. The substrate gap adjusting layer that is formed at the regions extending from the display region and each of the signal line driver circuits is formed on the same layer and with the same material as the scanning lines. In this case, material and shape of the substrate gap adjusting layer should be selected and formed so that it is not short circuited with the scanning lines and signal lines. For example, the substrate gap adjusting layer may be formed of a layer insulating film as an insulating member used in the liquid crystal display apparatus. When the substrate gap adjusting layer is formed of a conductive material, it should be patterned so that it is not shortcircuited with the scanning lines and signal lines.

According to the liquid crystal display apparatus of the present invention, the substrate gap adjusting region or substrate gap adjusting layer may be electrically insulated from the scanning lines and signal lines.

According to the present invention, the substrate gap at the display region is equally adjusted by the substrate gap adjusting region or substrate gap adjusting layer. In other words, since the substrate gap at the substrate gap adjusting regions that extend from the display region to each of the scanning line driver circuits and from the display region to each of the signal line driver circuits and that are covered with the sealing member is equally kept, the entire substrate gap of the two opposed substrates can be equally held. In this case, the substrates should be less skewed and twisted. So according to the present invention, since the substrate gap holding member (so-called spacer) that has been used in the display regions of conventional apparatuses can be omitted, and the image quality can be preferably improved.

According to the present invention, the scanning line driver circuits and signal line driver circuits are formed over the switching element array substrate that also has the scanning lines and signal lines (namely, the present invention is of a so-called driver circuit incorporated type), it can be preferably applied to a liquid crystal display apparatus where lead-out lines extend from pixel portions in four directions. However, the present invention is not limited to this construction. For example, in the construction that one end of each scanning line is connected to a scanning line driver circuit, the other end thereof is open, one end of each signal line is connected to a signal line driver circuit, and the other end thereof is open, (thus, the other end is not connected to a lead-out line extending from the sealing member), substrate gap adjusting regions or substrate gap adjusting layers that adjust the substrate gap at the regions covered with the sealing member on the other side may be formed so as to keep the thickness of the substrate gap to be equal over the entire regions of the sealing member.

As the switching elements, three-terminal elements such as TFTs (Thin Film Transistors), two-terminal elements such as MIM (Metal Insulator Metal) elements may be preferably used.

As the optical modulating layer, a liquid crystal composition, such as TN (Twisted Nematic) type or STN (Super Twisted Nematic) type, each of which has an optical modulating function), a polymer dispersing type where a liquid crystal material is dispersed in a resin matrix, another polymer dispersing type where a capsule shaped liquid crystal material is contained in a resin, or the like may be preferably used.

When the substrate gap adjusting region or substrate gap adjusting layer that keeps the substrate gap at the driver circuits formed at peripheral portions of the substrate and the substrate gap at the liquid crystal cell portion covered with the sealing member to be equal is formed for the driver circuit incorporated liquid crystal display apparatus, the gap between the two substrates can be equally kept.

Especially when the substrate gap at the regions of the signal lines covered With the sealing member and the substrate gap at the regions of the scanning lines covered with the sealing member are kept equal, the substrate gap in the direction that the scanning lines extend and the substrate gap in the direction that the signal lines extend can be kept equal over the entire surface of the liquid crystal cells. Thus, uneven colors and uneven contrast can be suppressed. According to the present invention, high quality display image can be obtained.

BEST MODES OF CARRYING OUT THE INVENTION

Next, with reference to the accompanying drawings, embodiments of the present invention will be described.
(First Embodiment)

Figure 1:
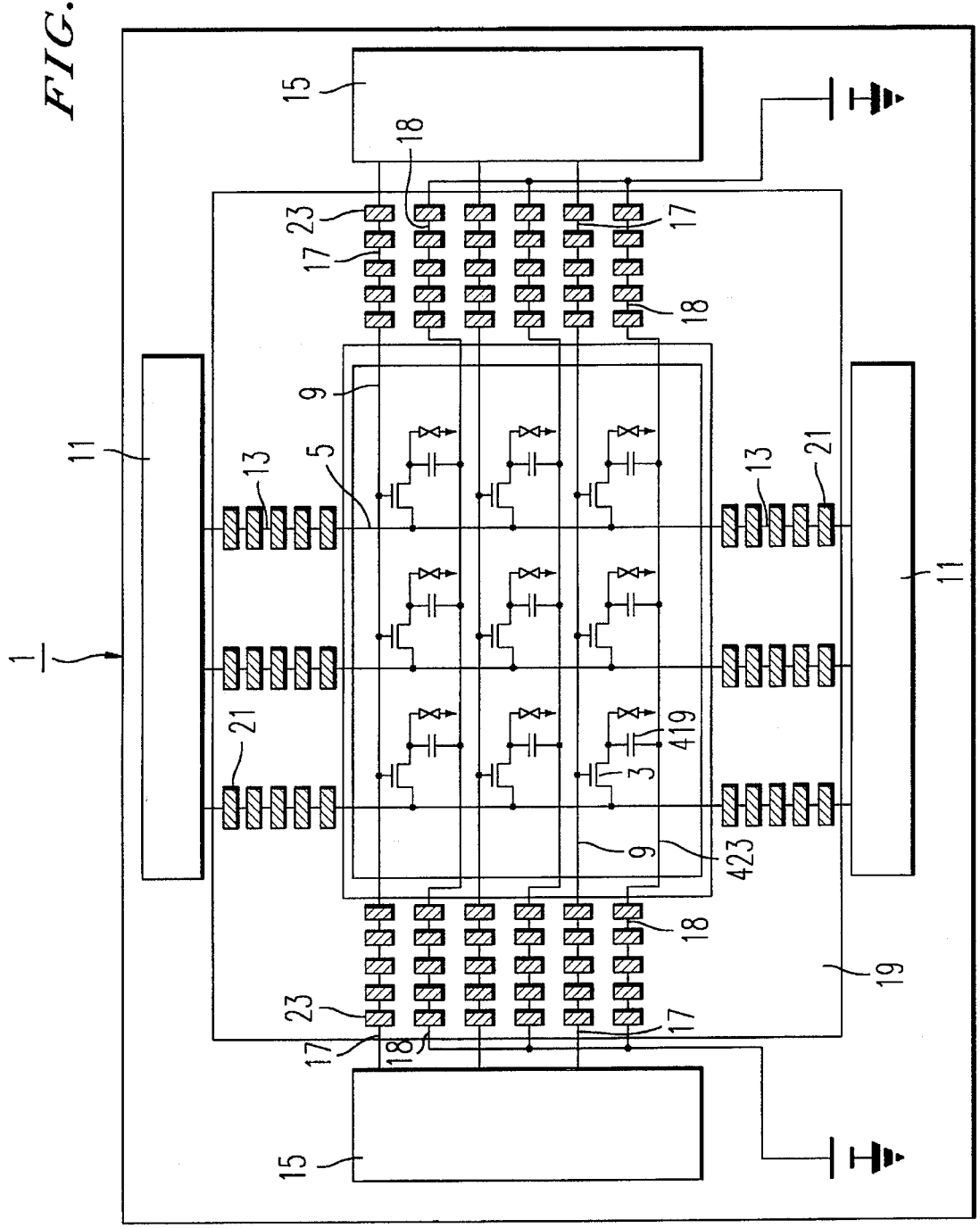
FIG. 1 is a schematic diagram showing a construction of a liquid crystal display apparatus according to a first embodiment.
Figure 2A:
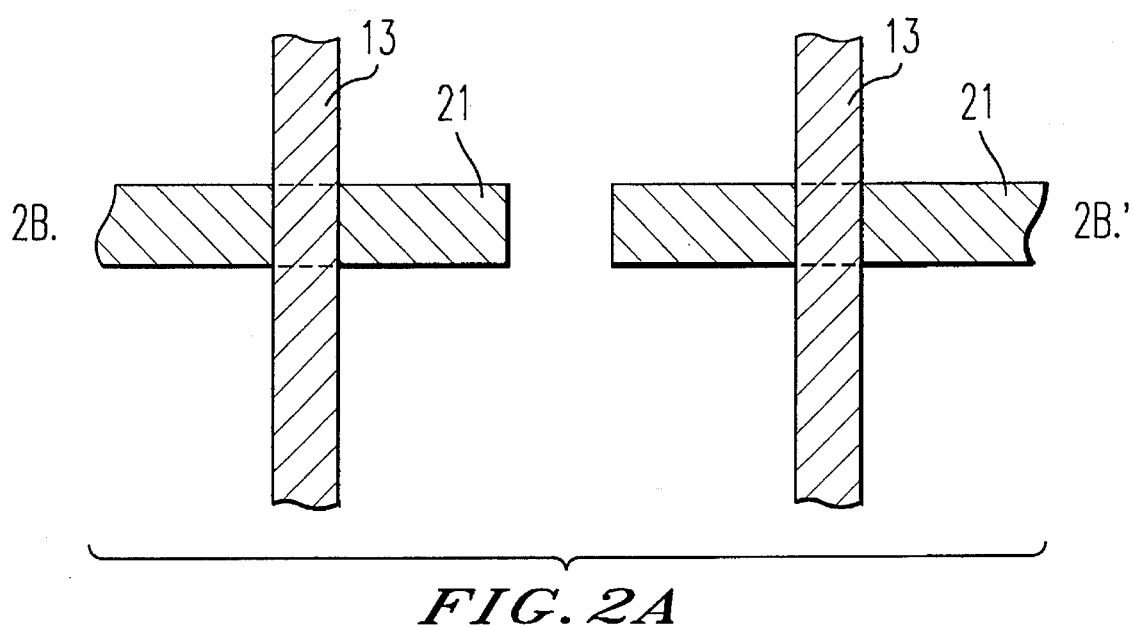
FIGS. 2(a) and 2(b) are schematic diagrams showing a construction in the vicinity of lead portions 13 of signal lines 5 of the liquid crystal display apparatus according to the first embodiment.
Figure 2B:
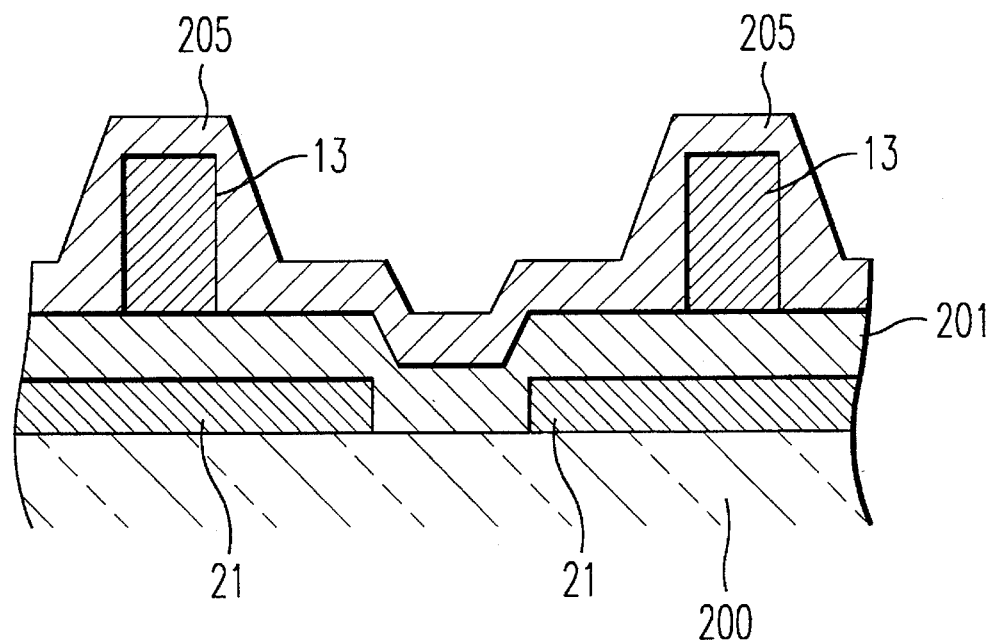
Figure 3A:
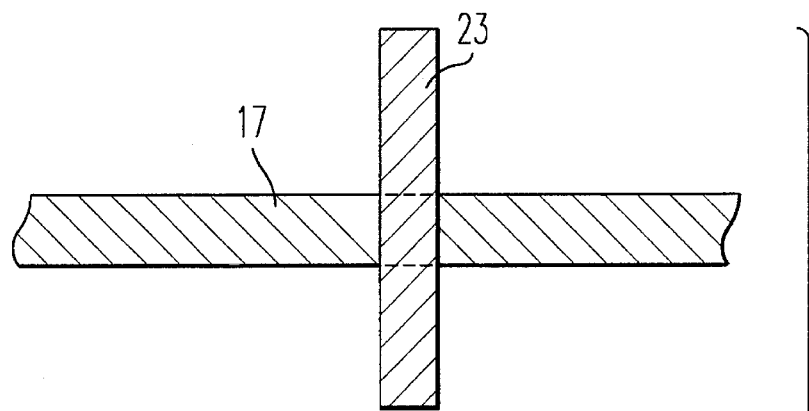
FIGS. 3(a) and 3(b) are schematic diagrams showing a construction in the vicinity of lead portions 17 of scanning lines 9 of the liquid crystal display apparatus according to the first embodiment.
Figure 3A:
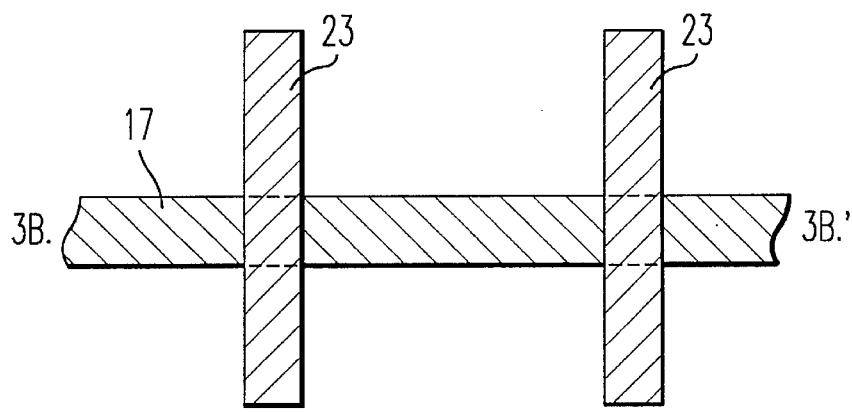
Figure 3B:
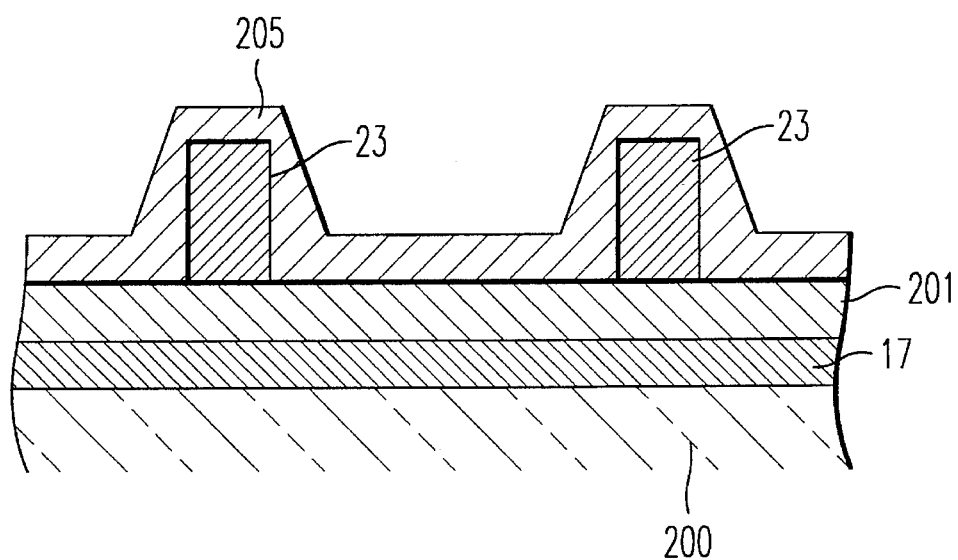
Figure 4A:
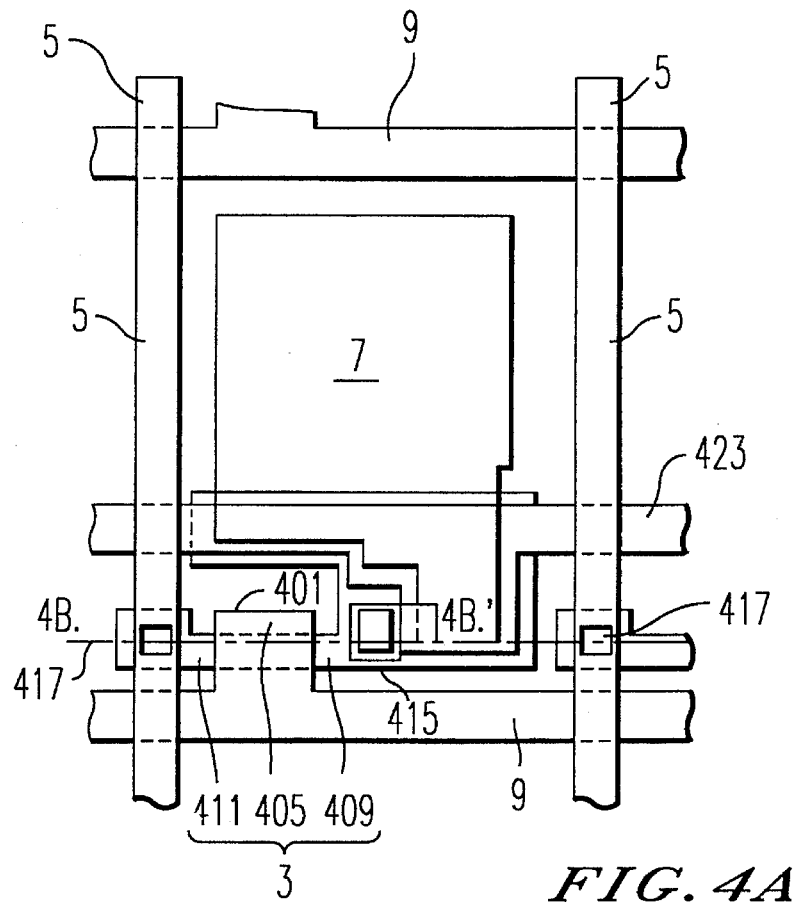
FIGS. 4(a) and 4(b) are schematic diagrams showing a construction of a pixel portion of the liquid crystal display apparatus according to the first embodiment.
Figure 4B:
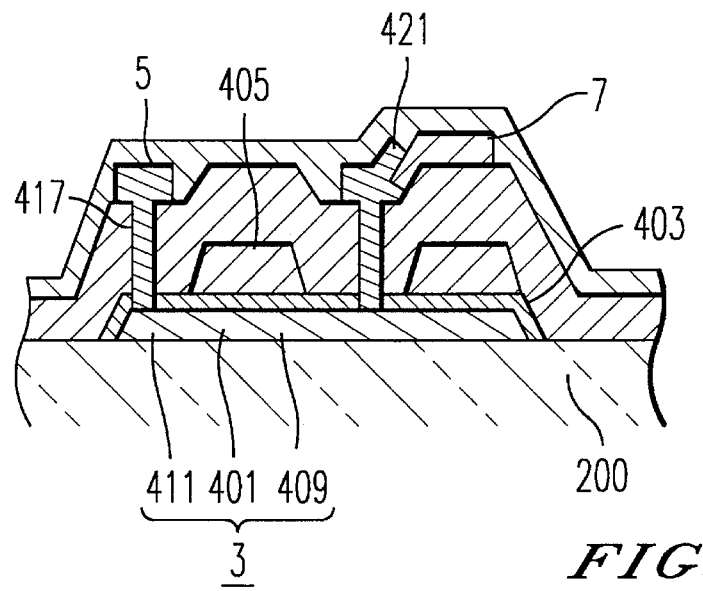

FIG. 1 is a plan view showing a TFT array substrate of a liquid crystal display apparatus according to the present invention. FIG. 2(a) is an enlarged plan view showing a construction in the vicinity of signal lines in a region extending from a display region and a signal line driver circuit. FIG. 2(b) is a sectional view taken along line C–C' of FIG. 2(a). FIG. 3(a) is an enlarged plan view showing a construction in the vicinity of scanning lines in a region extending from a display region to a scanning line driver circuit. FIG. 3(b) is a sectional view taken along line D–D' of FIG. 3(a). FIG. 4(a) is an enlarged plan view showing a pixel portion of the liquid crystal display apparatus according to the present invention. FIG. 4(b) is a sectional view taken along line E–E' of FIG. 4(a). In FIGS. 2 and 3, members that are made of the same material are hatched for convenience. In the drawings of the individual embodiments, for simplicity of description, a liquid crystal display apparatus providing only nine pixels are shown. The edge line of an opposed substrate positioned opposite to a TFT array substrate is nearly the same as the outer edge line of a sealing member. For simplicity, the illustration and description of the opposed substrate for each embodiment will be omitted.

As shown in FIG. 1, TFTs 3 are formed as switching elements of a display region on a TFT array substrate 1 of the liquid crystal display apparatus are formed. A drain 411 of each TFT 3 is connected to a signal line 5 through a contact hole 417. A source 409 is connected to a pixel electrode 7 through a contact hole 415 and a conductive pattern. A gate 405 is connected to a scanning line 9. A signal line 5 that applies a predetermined image signal voltage is connected to a signal line driver circuits 11 that drive the signal line 5 through lead portions 13 of the signal line 5. The scanning line 9 that applies a scanning voltage (scanning pulse) to the gate 405 of the TFT is connected to a scanning line driver circuits 15 through lead portions 17 of the scanning line 9. The scanning voltage turns on or off the TFT 3. The signal line 5 is incorporated with the lead portions 13 thereof. Substantially, the lead portions 13 extend from the signal line 5. Likewise, the scanning line 9 is incorporated with the lead portions 17 thereof. Substantially, the lead portions 17 extend from the scanning line 9.

Substrate gap adjusting members 21 and 23 are formed at regions where the lead portions 13 of the signal lines 5 and the lead portions 17 of the scanning lines 9 are covered with a sealing member 19, respectively.

Each substrate gap adjusting layer 21 is made of the same film as the lead portion 17 of the scanning line 9 and patterned over the lead portion 13 of the signal line 5. Likewise, each substrate gap adjusting layer 23 is made of the same film as the lead portions 13 of the signal line 5 and patterned over the lead portions 17 of the signal line 9.

As shown in FIG. 2(b), which is a sectional view, a region in the vicinity of the lead portion 13 is formed of a glass substrate 200, the substrate gap adjusting layer 21, a layer insulating film 201, the lead portion 13 of the signal line 5, and a protecting film 205. The substrate gap adjusting layer 21, the layer insulating film 201, the lead portion 13 of the signal line 5, and the protecting film 205 are layered over the glass substrate 200 in this order. The substrate gap adjusting layer 21 is formed of a poly-silicon film that contains impurities and has a low resistance. The lead portion 13 of the signal line 5 is formed of an Al/Cr film.

On the other hand, as shown in FIG. 3(b), which is a sectional view, a region in the vicinity of the lead portion 17 of the scanning line 9 is formed of the glass substrate 200, the lead portion 17 of the scanning line 9, the layer insulating film 201, the substrate gap adjusting layer 23, and the protecting film 205. The lead portion 17 of the scanning line 9, the layer insulating film 201, the substrate gap adjusting layer 23, and the protecting film 205 are formed over the glass substrate 200 in this order. The lead portion 17 of the scanning line 9 is formed of a poly-silicon film that contains impurities and has a low resistance. The substrate gap adjusting layer 23 is formed of an Al/Cr film.

Thus, each of the region in the vicinity of the lead portion 13 of the signal line 5 and the region in the vicinity of the lead portion 17 of the scanning line 9 is formed of the glass substrate 200, the low-resistance poly-silicon film, the layer insulating film, the Al/Cr film, and the protecting film, which are layered in this order. Thus, although the pattern of the lead portion 13 of the signal line 5 is different from the pattern of the lead portion 17 of the scanning line 9, the construction of the region in the vicinity of the lead portion 13 is the same as the construction of the region in the vicinity of the lead portion 17, in terms of the material of each layers. Therefore, the thickness of the region in the vicinity of the lead portion 13, $t_1$ (shown in FIG. 2), is equal to $t_2$ (shown in FIG. 3) the thickness of the region in the vicinity of the lead portion 17, except for fabrication error. Thus, according to the present invention, the difference between $t_1$, which is the thickness of the region in the vicinity of the lead portion 13 of the signal line 5, and $t_2$, which is the thickness of the region in the vicinity of the lead portion 17 of the scanning line 9 is not more than 0.1 μm.

The TFT array substrate 1 and an opposed substrate (not shown) that has a counter electrode (made of ITO) and an aligning film are positioned face to face with a gap. A sealing member (that serves a bonding agent as well as sealing member) is printed over the lead portions 13 of the signal lines 5, which are connected to signal line driver circuits 11, and over the lead portions 17 of the scanning lines 9, which are connected to scanning line driver circuits 15. Both the substrates are layered so that aligning direction of the first substrate is perpendicular to the aligning direction of the second substrate. And with pressing, both the substrates are bonded to each other at the sealing member. A liquid crystal composition as an optical modulating layer (not shown) that has positive dielectric anisotropy is filled in so-called empty cells defined by both the substrates and the sealing member 19. In this manner, the liquid crystal display apparatus is formed.

Next, a fabrication method of the above-described TFT array substrate 1 will be described.

An amorphous silicon film that becomes active layers 401 of TFT channel regions for switching elements and driver circuits (not shown) is formed over a quartz substrate as a transparent insulating substrate. The amorphous silicon film is made by low pressure CVD method. The amorphous silicon film is converted to a poly-silicon film by solid-phase growth technology at 600° C. for 24 fours, and patterned.

Next, a gate insulating film 403 is formed by heat oxidization method. Then, a second poly-silicon film with a low resistance is formed by low pressure CVD method. This second poly-silicon film becomes the gates 405 of TFTs, the scanning lines 9, the lead portions 17 thereof, and the substrate gap adjusting members 21.

A source 409 and a drain 411 in the active layer 401 beside the gate 405 are formed by a ion doping method using a phosphorus (P) as an n-type dopant.

A layer insulating film 201 is formed by low pressure CVD method and contact holes 415 and 417 are formed thereon.

Each storage capacitor 419, which is a MOS capacitor, is formed with the active layer 401 and the storage capacitor line 423 on the active layer 401 through the gate insulating film 403, and the pixel electrode 7 is disposed on the storage capacitor line 423 through the insulating film 201. The storage capacitor 419 is referred to as Cs. The storage capacitor line 423 is incorporated with the lead portion 18 in a region covered with the sealing member 19. The storage capacitor line 423 (and the lead portion 18 thereof) may be formed in the same forming manner of a conventional storage capacitor line with the film used for the gate 405. Alternatively, although the film forming step and the like are increased, the storage capacitance line 423 and the lead portion 18 may be formed of other than the material of the gate 405. Although the number of film forming steps increases, the material of the storage capacitor lines 423 and the lead portions 18 thereof may be formed of other than the material of the gate 405. The material of the storage capacitor lines 423 or the lead portions 18 thereof may be formed of other than the material of the gate 405.

The drain 411 of the TFT 3 is connected to the signal line 5 through the contact hole 417. The source 409 is connected to the pixel electrode 7 through the contact hole 415 and a conductive pattern. The gate 405 is connected to the scanning line 9. The signal line 5 is formed of a double layered structure Al/Cr layer and connected to a signal line driver circuit 11 through the lead portion 13 that extends from the signal line 5. The scanning line 9, which is formed of a low resistance poly-silicon film that contains impurities, is connected to a scanning line driver circuit 15 through the lead portion 17 of the scanning line 9.

As shown in FIGS. 2 and 3, substrate gap adjusting layers 21 and 23 are formed at least partly on the two different lead portions 13 and 17, respectively. The thickness of the lead portions 13 measured from the front surface of the substrate is equal to or several times larger than the thickness of the lead portions 17 measured from the front surface of the substrate. The substrate gap adjusting layers 23 are formed of a poly-silicon film that is the same material as the scanning lines 9. The substrate gap adjusting layers 21 are formed of an Al/Cr film that is the same material as the signal lines 5. The width of each of the substrate gap adjusting layers 23 and 21 is larger than the width of each lead portion. In addition, these substrate gap adjusting layers 23 and 21 are formed so that they do not interfere with adjacent lead portions.

The substrate gap adjusting layers 21 and 23 may be formed in a linear pattern as shown in FIG. 2. Or the substrate gap adjusting layers 21 and 23 may be formed in a zigzag pattern as shown in FIG. 3.

A protecting film 205 is formed on the uppermost layer so as to cover each pattern. The protecting film 205 is made of SiNx.

As the opposed substrate (not shown), a polyimide film is formed over the front surface of the TFT array substrate 1. And an aligning film (not shown) is formed by rubbing the polyimide film on the opposed substrate. In addition, a spacer (not shown) is formed on the front surface of the opposed substrate. A sealing member 19 that is made by mixing glass fibers of 0.1% by weight with epoxy bonding agent is formed at each lead portion except for an injecting opening (not shown). Thus, this sealing member 19 serves both for a sealing member and a bonding agent. After the two substrates are aligned and layered, ultraviolet rays are radiated to the sealing member 19 so as to bond the two substrates together. As another material of the sealing member 19, a heat hardening type sealing member/bonding agent may be used.

Thereafter, by a conventional method, a liquid crystal composition (not shown) is injected from the injecting opening. Then, the injecting opening is sealed with a ultraviolet hardening resin. Thus, the fabrication of the liquid crystal display apparatus has been completed.

Since the liquid crystal display apparatus fabricated in this manner has the substrate gap adjusting layers 21 and 23 at least partly on each lead portion, the gap between the two substrates becomes equal. In particular, when the thickness of the lead portion 13 of each signal line 5 is equal to the thickness of the lead portion 17 of each scanning line 9, the gap between the two opposed substrates can become equal both in scanning line direction (horizontal direction on the display region) and signal line direction (vertical direction on the display region). Thus, uneven colors and uneven contrast in the display region (or screen) can be suppressed, thereby improving a display image quality.

In addition, since the sealing member 19 is formed on the lead portion 13 of each signal line 5 and the lead portion 17 of each scanning line 9, the scanning line driver circuits 15 and the signal line driver circuits 11 can be prevented from being lesser damaged by glass fibers of the sealing member 19 than the conventional liquid crystal display apparatus.

When the widths of the substrate gap adjusting layers 21 and 23 are larger than the widths of the lead portions 13, 17, and 18 and the substrate gap adjusting layers 21 and 23 do not contact the adjacent lead portions 13, 17, and 18, even if a pattern dislocation takes place in fabrication process due to a mask disalignment, the substrate gap adjusting layers 21 and 23 are formed over the lead portions 13, 17, and 18. And with the substrate gap adjusting layers 21 and 23, even if the lead portions 13, 17, and 18 are shortcircuited due to an insulation defect of the layer insulating layer 201, the lead portions 13, 17, and 18 can be prevented from being shortcircuited with other lead portions.

When the substrate gap adjusting layers 21 and 23 are formed in a linear pattern or zigzag pattern that has a plurality of rows, space adjusting members, which are glass fibers, are likely formed on the plurality of substrate gap adjusting layers 21 and 23. Thus, the gap between the two substrates securely becomes equal in a wider area.

In the above-described embodiment, the substrate gap adjusting layers 21 and 23 were applied to a four-layer construction consisting of a poly-silicon film, a layer insulating film, an Al/Cr dual-layer film, and a protecting film. However, the present invention is not limited to such layer construction. In this embodiment, in addition to Al/Cr, as a material of the scanning lines, signal lines, and the like, for example, $WSi_x$, $MoSi_x$, or Al/Ti may be preferably used. When silicide such as $WSi_x$ is used, hillock can be preferably suppressed. In addition, when another layer insulating film and ITO are formed between for example the Al/Cr dual-layer film and the protecting film, not only the gap between the substrates become equal, but also the signal lines made of the Al/Cr dual-layer film can be prevented from being damaged by the glass fibers.

As a material of each gate electrode, for example, doped p-Si (containing impurities for lowering resistance), $WSi_x$, or $MoSi_x$ may be preferably used. With such a material, the resistance of the electrode can be lowered.

In the embodiment, as an example, the substrate gap adjusting layers 21 and 23 were formed in a linear pattern and a zigzag pattern, respectively. However, it should be noted that the present invention is not limited to these patterns. Instead, when the substrate gap adjusting layers 21 and 23 formed over the respective lead portions do not contact adjacent lead portions, both the substrate gap adjusting layers 21 and 23 may be formed in a linear pattern or a zigzag pattern. In addition, unlike with this embodiment, the lead portions 13 of the signal lines may be formed in a zigzag pattern, whereas the lead portion 17 of the scanning lines may be formed in a linear pattern.

Moreover, the material of the substrate gap adjusting layers 21 and 23 is not limited to the material used in the liquid crystal display apparatus according to the above-described embodiment. For example, with an insulating material that is different from the material of the scanning lines 9 and the signal lines 5, the substrate gap adjusting layers 21 and 23 may be formed. With this insulating material, even if the substrate gap adjusting layers 21 and 23 contact adjacent scanning lines or adjacent signal lines due to pattern dislocation in fabrication process, a shortcircuit defect can be prevented.

However, when the substrate gap adjusting layers 21 and 23 are formed of the material for use with the signal lines 5 and the scanning lines 9 and the material for use with the active layer of each TFT 3, the fabrication process and the construction of the liquid crystal display apparatus can be preferably simplified.

In this embodiment, the widths of the substrate gap adjusting layers 21 and 23 were equal to or several times larger than those of the lead portions 13, 17, and 18. However, the present invention is not limited to these widths. For example, the widths of the substrate gap adjusting layers 21 and 23 may be equal to the width of the sealing member 19.

Moreover, in this embodiment, as the material of the gap controlling member mixed with the sealing member, glass fibers were used. However, when the gap between the substrates is kept equal, for example granular space controlling member (such as micro pearls) may be used. Or, mixture of gap controlling member such as glass fibers may be omitted.

Since the liquid crystal display apparatus according to the above-described embodiment of the present invention is formed of two substrates whose gap is kept equal (namely, the cell gap is kept equal), a high quality and high contrast display image can be obtained with this apparatus.

With three liquid crystal display panels according to the above-described embodiment of the present invention, a projection type liquid crystal display apparatus having a light source, a light source color separating system, a liquid crystal display panel, a color combining system, and a projection lens system that were disposed in this order was fabricated. With this apparatus, the image display characteristics were experimented. Experimental results show that the apparatus displayed an image without uneven colors and uneven contrast.

When driver circuits are formed on four sides of a substrate and the driver circuits are connected to both ends of the scanning lines and the signal lines as with the liquid crystal display apparatus according to the first embodiment, redundancy can be provided. Thus, even if one driver circuit malfunctions, with the other driver circuit, the apparatus can be correctly operated. And when both the driver circuits are operated, distortion and dullness due to voltage drop of signal waveform can be prevented. In this case, since the driver circuits are not covered with the sealing member and the opposed substrate, a defect of the liquid crystal display apparatus can be preferably repaired by for example laser repair method.

(Second Embodiment)

Figure 5:
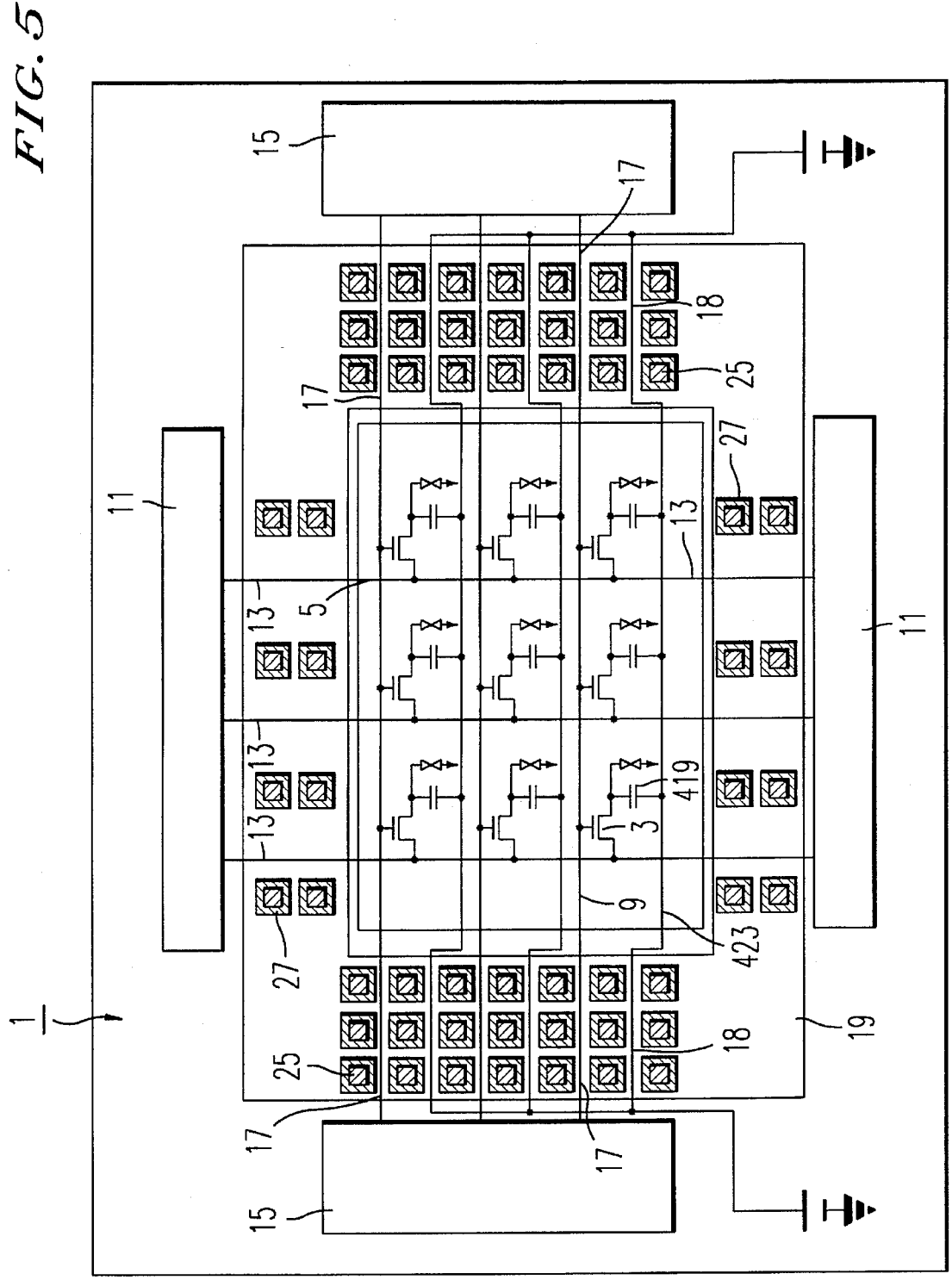
FIG. 5 is a schematic diagram showing a construction of a liquid crystal display apparatus according to a second embodiment.

FIG. 5 is a plan view showing a liquid crystal display apparatus according to a second embodiment of the present invention. For simplicity, the same portions as the first embodiment are denoted by the same reference numerals and their detail description is omitted. Thus, only feature portions of the second embodiment will be described.

In the liquid crystal display apparatus according to the second embodiment, substrate gap adjusting layers 25 are formed in the region covered with sealing member 19, extending along lead portions 17 of scanning lines 9 and lead portions 18 of storage capacitor lines 423. Likewise substrate gap adjusting layers 27 are formed in the region covered with sealing member 19, along lead portions 13 of signal lines 5.

When both the substrate gap adjusting layers 25 and 27 are formed of a material of a liquid crystal display apparatus, the forming process and constructions of the substrate gap adjusting layers 25 and 27 can be simplified. For example, in the second embodiment, the material of the substrate gap adjusting layers 25 and 27 is the same as the material used in the first embodiment. In other words, with the material of the scanning lines 9 (and the lead portions 17 thereof), the material of the signal lines 5 (and the lead portions 13 thereof), the material of the layer insulating film 201, and the material of the protecting film 205, the height of the substrate gap adjusting layers 25 at the region of the lead portion 17 of each scanning line 9 measured from the front surface of the substrate 200 becomes equal to the height of the substrate gap adjusting layers 27 at the region of the lead portion 13 of each signal line 5 measured from the front surface of the substrate 200. The substrate gap adjusting layers 25 and 27 are formed so that their heights are larger than the heights of other constructional portions such as the TFTs 3, the storage capacitors 419, and the storage capacitor lines 423. Thus, the substrate gap adjusting layers 25 and 27 can support the lead portions 17 of the scanning lines 9 and the lead portions 13 of the signal lines 5 at the equal height.

The layer constructions and materials of the scanning lines 9, the lead portions 17 thereof, the signal lines 5, the lead portions 13 thereof, the TFTs 3, the storage capacitor lines 423, and the sealing members 19 are the same as those of the first embodiment.

According to the liquid crystal display apparatus of the second embodiment, since the gap of the two opposed substrates, which is cell gap, is kept equal, a high quality and high contrast display image can be obtained with this apparatus.

The materials of the substrate gap adjusting layers 25 and 27 are not limited to those used in this embodiment. For example, other than the material of the liquid crystal display apparatus may be used for the substrate gap adjusting layers 25 and 27. In this case, since the thicknesses of the substrate gap adjusting layers 25 and 27 are larger than those of other constructional portions, the materials that can be easily formed and whose thicknesses can be easily controlled should be selected for the substrate gap adjusting layers 25 and 27.

In the second embodiment, the two types of substrate gap adjusting layers were formed, one on the lead portions 17 of the scanning lines 9 and the other on the lead portions 13 of the signal lines 5. However, the present invention is not limited to this construction. Instead, one type of substrate gap adjusting layers may be formed either on the lead portions 17 of the scanning lines 9 or the lead portions 13 of the signal lines 5 and the other one can be omitted. In this case, the substrate gap adjusting layers should be formed at regions lower than other regions so as to level the surface.

In this embodiment, the substrate gap adjusting layers 25 and 27 were formed not to contact the lead portions 13, 17, and 18. However, the present invention is not limited to this construction. Instead, the substrate gap adjusting layers 25 and 27 may be formed along the lead portions 13, 17, and 18. The same substrate gap adjusting layers 25 and 27 may be formed so that they do not contact the adjacent lead portions 13, 17, and 18, respectively. When at least adjacent lead portions 13, 17, and 18 are formed not to contact each other, the patterns of the substrate gap adjusting layers 25 and 27 of the second embodiment may be variously modified. For example, the substrate gap adjusting layers 25 and 27 may be formed in long patterns along with the lead portions 13, 17, and 18 (without contacting them).

(Third Embodiment)

Figure 6:
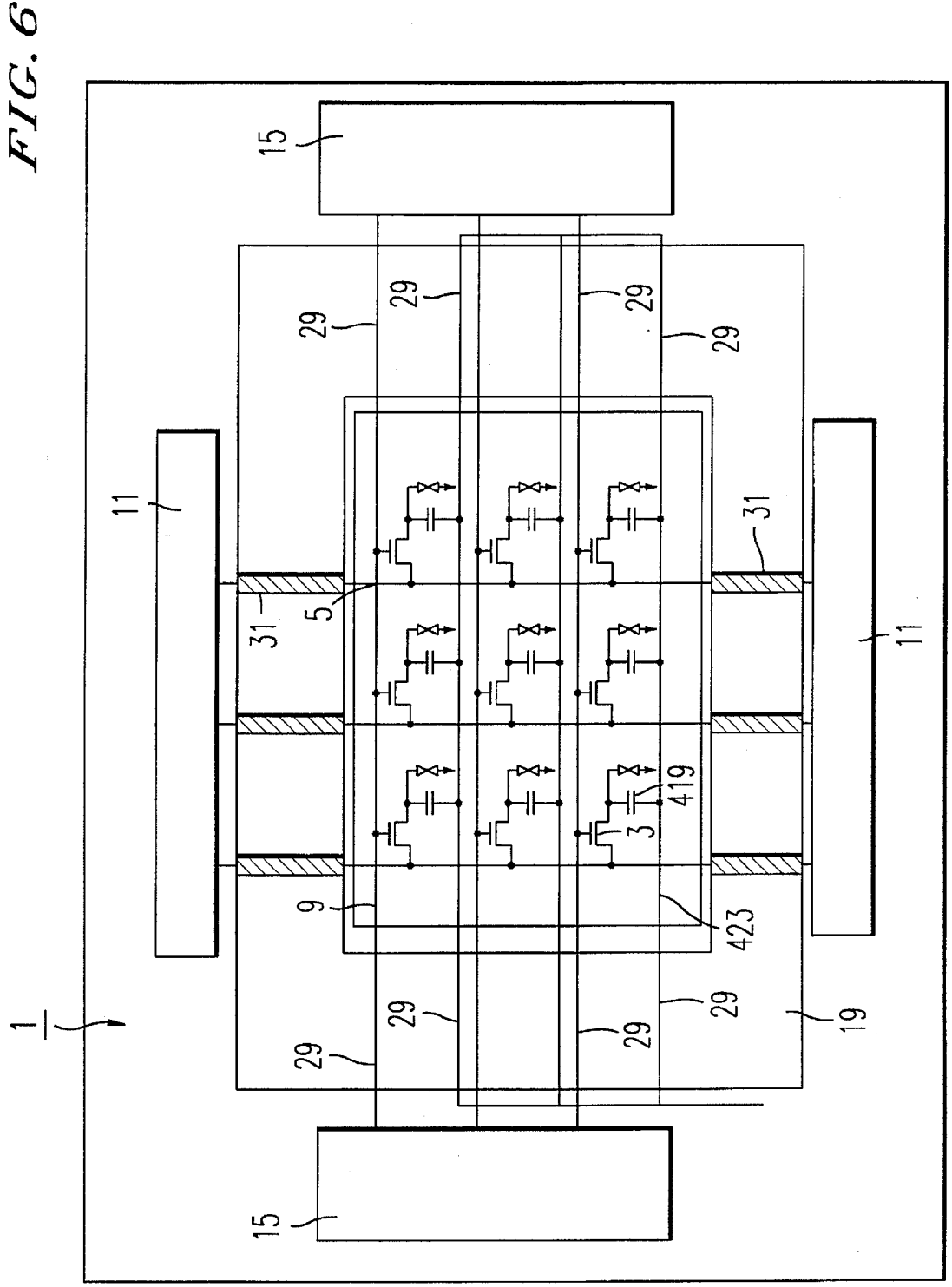
FIG. 6 is a schematic diagram showing a construction of a liquid crystal display apparatus according to a third embodiment.
Figure 7:
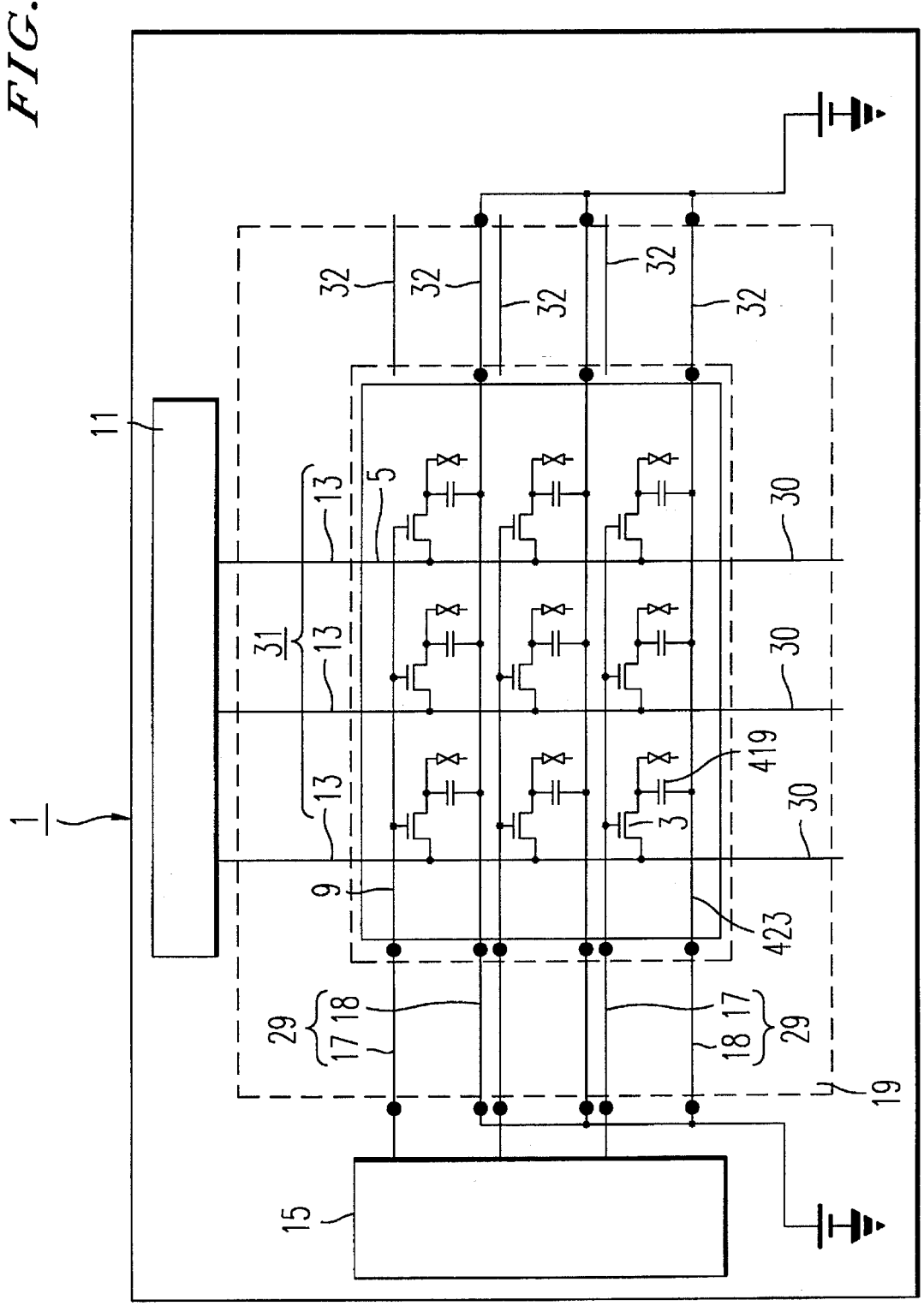
FIG. 7 is a schematic diagram showing a construction of a liquid crystal display apparatus with driver circuits disposed on one side thereof according to the third embodiment.

FIGS. 6 and 7 are plan views showing a liquid crystal display apparatus according to a third embodiment of the present invention. In FIGS. 6 and 7, for simplicity, the same portions as the first embodiment are denoted by the same reference numerals. Only feature portions of the third embodiment will be described.

In the liquid crystal display apparatus according to the third embodiment, lead portions 17 of scanning lines 9 and lead portions 18 of storage capacitor lines 423 are formed of for example an aluminum (Al) layer, which has high conductivity, at regions that extend from a display region to a scanning line driver circuit 15 and to a signal line driver circuit 11, and to a signal line driver circuit 11, and that are covered with a sealing member 19. The material of the lead portions 17 and 18 are different from the material of the scanning lines 9 and storage capacitor lines 423. The lead portions 17 and 18 are themselves used for substrate gap adjusting layers 29 in this embodiment, as shown in FIG. 6.

Likewise, lead portions 13 of signal lines 5 are formed of Al at regions that extend from the display region to a signal line driver circuit 11 and that are covered with a sealing member 19. The material of the lead portions 13 is different from the material of the signal lines 5. The lead portions 13 are used for substrate gap adjusting layers 31 in this embodiment, as shown in FIG. 6.

Both the substrate gap adjusting layers 29 and 31 are formed so that the height of the substrate gap adjusting layers 29 measured from the front surface of the substrate 200 is equal to the height of the substrate gap adjusting layers 31 measured from the front surface of the substrate 200. Thus, the gap of the substrate on the lead portions 17 of the scanning lines 9, which are used as the substrate gap adjusting layers 29 in this embodiment, is kept equal to the gap of the substrate on the lead portions 13 (in this embodiment, be used as gap adjusting layers 31) of the signal lines 5.

The constructions and materials of the constructional portions such as the scanning lines 9, the lead portions 17 thereof, the signal lines 5, the lead portions 13 thereof, the TFTs 3, the storage capacitor lines 423, the sealing member 19, the scanning line driver circuit 15, and the signal line driver circuit 11 are the same as those of the first embodiment.

Since the gap between the two opposed substrates (cell gap) is kept equal, a high quality and high contrast display image can be obtained with this apparatus.

The material for use in the liquid crystal display apparatus is not limited to the material used in the third embodiment. The material of the substrate gap adjusting layers 29 and 31 is not limited to Al. For example, the substrate gap adjusting layers 29 and 31 may be formed of three layers of Cr/Mo/Cr. The substrate gap adjusting layers 29 and 31 may be formed of p-Si with dopants injected so as to lower the resistance. Examples of materials with low resistance are silicide compounds such as WSix and MoSix.

In this embodiment, the substrate gap adjusting layers 29 and 31 are formed as the lead portions 17 of the scanning lines 9 and the lead portions 13 of the signal lines 5, respectively. However, the present invention is not limited to this construction. Instead, one type of substrate gap adjusting layers may be formed as either the lead portions 17 of the scanning lines 9 or the lead portions 13 of the signal lines 5. In this case, the substrate gap adjusting layers 29 or 31 should be formed on regions lower than other regions so as to level the surface.

In this embodiment, all the lead portions 13, 17, and 18 are formed as the substrate gap adjusting layers 29 and 31. However, the present invention is not limited to this construction. Instead, for example, the lead portions 13 and 17 may be formed of other material than that of signal line 5 and scanning line 9. In addition, the storage capacitor lines 423 may be incorporated with the lead portions 18, but not be used as the substrate gap adjusting layers 29. In other words, the substrate gap adjusting layers 29 and 31 are formed so that the thickness of the lead portions 13 of the scanning lines 9 is equal to the thickness of the lead portions 17 of the signal lines 5. Depending on the layer construction of the liquid crystal display apparatus, at least one type of the lead portions 13, 17, and 18 may be used for the substrate gap adjusting layers.

In the third embodiment, the plane patterns of the substrate gap adjusting layers 29 and 31 were formed of narrow lines with a width similar to those of the lead portions 13, 17, and 18. However, the patterns of the substrate gap adjusting layers 29 and 31 may be formed with a large width. In this case, the adjacent substrate gap adjusting layers 29 and 31 should be spaced apart from each other so as to prevent them from being shortcircuited. In the third embodiment, since the substrate gap adjusting layers 29 and 31 were incorporated with the lead line portions 13, 17, and 18, they were made of a conductive material. Thus, when they are contacted with each other, they are shortcircuited. Thus, when at least the adjacent lead portions 13, 17, and 18 are formed in such a manner they are not short circuited each other, the patterns of the substrate gap adjusting layers 29 and 31 may be changed in various manners.

In the third embodiment, a liquid crystal display apparatus with driver circuits disposed on four sides of the peripheral portions of the substrate was shown. However, the present invention is not limited to such a construction. Instead, the present invention may be applied to a liquid crystal display apparatus with a construction as shown in FIG. 7. In this liquid crystal display apparatus, a scanning line driver circuit 15 is disposed on one side of the peripheral portions of the TFT array substrate 1. The scanning line driver circuit 15 is connected to one end of each of the scanning lines 9. The other end of each of the scanning lines 9 is kept open. And likewise, the signal line driver circuit 11 is disposed on one of two sides perpendicular to the side of the scanning line driver circuit 15. The signal line driver circuit 11 is connected to one end of each of the signal lines 5. The other end of each of the signal lines 5 are kept open.

In this case, the lead line portions 13 in the region nearly covered with the sealing member 19 formed between the signal lines 5 and the signal line driver circuit 11 and the lead line portions 17 and 18 in the region nearly covered with the sealing member 19 disposed between the scanning lines 9 and the scanning line driver circuit 15 are incorporated with the substrate gap adjusting layers 29 and 31 as with the third embodiment. In this case, the substrate gap adjusting layers 30 and 32 that are similar to the lead line portions 13, 17, and 18 are formed on the open end side of the signal lines 5 and the scanning lines 9. The substrate gap adjusting layers 30 and 32 may be electrically connected to the signal lines 5 and the scanning lines 9, respectively. As an alternative method, the substrate gap adjusting layers 30 and 32 may be formed as so-called dummy patterns so that they are disconnected from the signal lines 5 and the scanning lines 9. In the example shown in FIG. 7, the substrate gap adjusting layer 30 is incorporated with the signal lines and electrically connected thereto. And, the substrate gap adjusting layers 32 are incorporated with and electrically connected to the storage capacitor lines 423 rather than the scanning lines 9. Each of the adjacent patterns of the substrate gap adjusting layers 30 and 32 may be electrically insulated from each other. In contrast, each of the adjacent patterns of the substrate gap adjusting layers 30 and 32 may be electrically connected to each other.

Thus, even in the liquid crystal display apparatus with driver circuits connected to one side of each of the scanning lines and signal lines, when the substrate gap adjusting layers 30 and 32 are formed on the other side, the gap between the TFT array substrate 1 and the opposed substrate can be equally kept in the longitudinal direction of the scanning line driver circuit 15 and the longitudinal direction of signal line driver circuit 11.

The present invention is not limited to this construction. The scanning line driver circuits 15 may be disposed on both sides of the substrates so that they are connected to both ends of each of the scanning lines 9, whereas the signal line driver circuit 11 may be disposed on one side of the substrate so that it is connected to one end of each of the signal lines 5 and the other end is kept open.

In this case, as shown in FIG. 7, a dummy pattern with the same height as the substrate gap adjusting layers 31 may be formed as the substrate gap adjusting layers 30.

(Fourth Embodiment)

FIG. 8 is a plan view showing a liquid crystal apparatus according to a fourth embodiment of the present invention. For simplicity, the same portions as the first embodiment are denoted by the same reference numerals. Only feature portions of the fourth embodiment will be described.

In the liquid crystal display apparatus according to the fourth embodiment, storage capacitors are formed outside a display region, in particular, in a region covered by a sealing member.

Figure 8A:
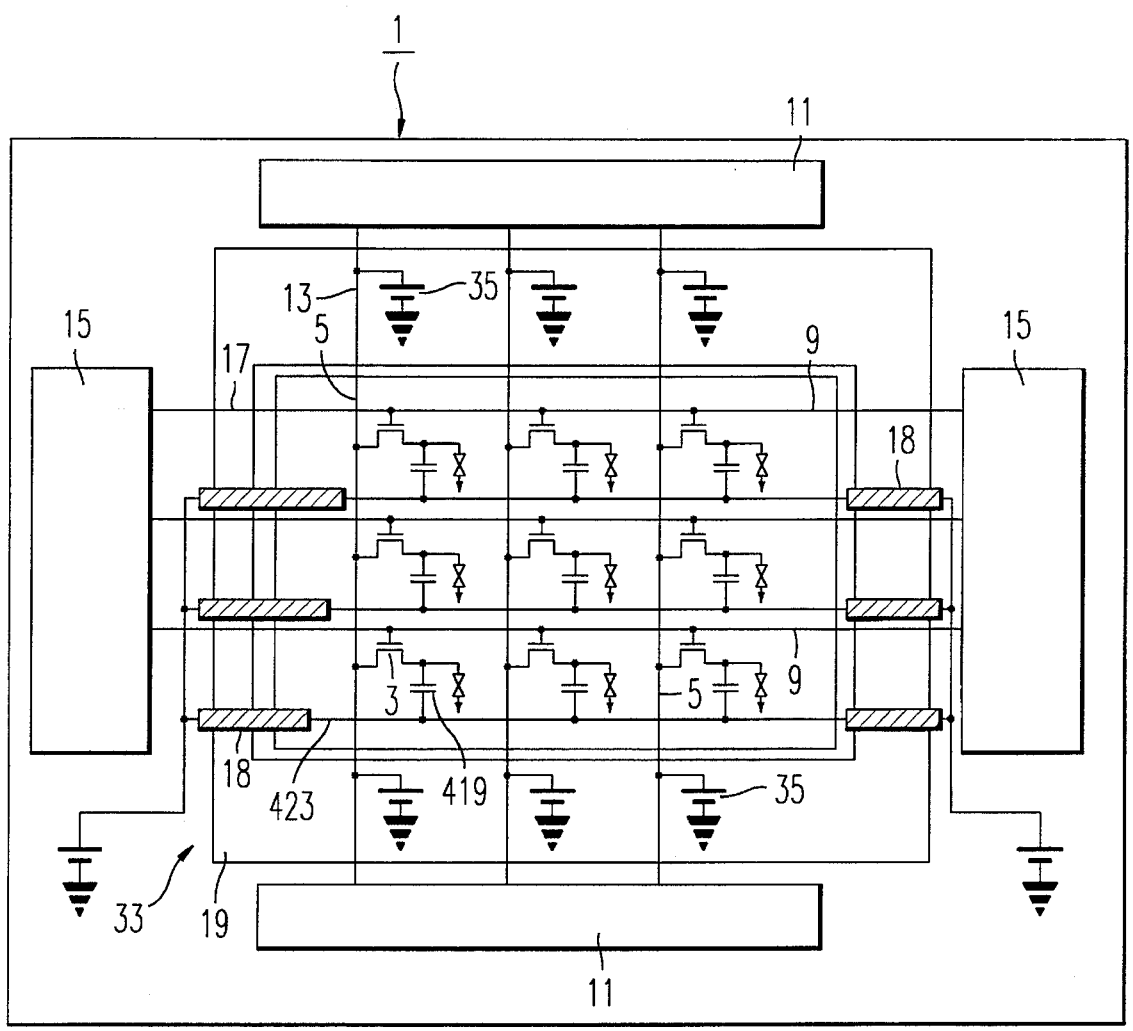
FIGS. 8(a) and 8(b) are schematic diagrams showing a construction of a liquid crystal display apparatus according to a fourth embodiment.

As shown in FIG. 8(a), a substrate gap adjusting region 33 extends from a display region having pixel electrodes 7 to each of scanning line driver circuits 15 and from the display region to each of signal line driver circuits 11. Almost of all the substrate gap adjusting region 33 is covered with the sealing member 19. The substrate gap adjusting region 33 keeps the gap between two opposed substrate to equal. In reality, storage capacitors 35 are formed along lead portions 13 in the substrate gap adjusting region 33. One end of each of the storage capacitors 35 is connected to a corresponding lead portion 13. The other end of each of the storage capacitors 35 is connected to a predetermined voltage source. The substrate gap on the lead portions 13 of the signal lines 5 is supported by the height of the storage capacitors 35 on the front surface of the substrate 200. In addition, the storage capacitors 35 are used to store proper image signal voltages corresponding to the signal lines 5.

The storage capacitors 35 may be formed other than the region covered with the sealing member 19. In addition, the storage capacitors 35 may be formed inside or outside the display region. The storage capacitors 35 may be formed inside the driver circuits. However, when the storage capacitors 35 are formed in the region covered with the sealing member 19 as with the fourth embodiment, the storage capacitors 35 can be used as the substrate gap adjusting layer. Thus, this embodiment is preferable from this point of view.

Figure 8B:
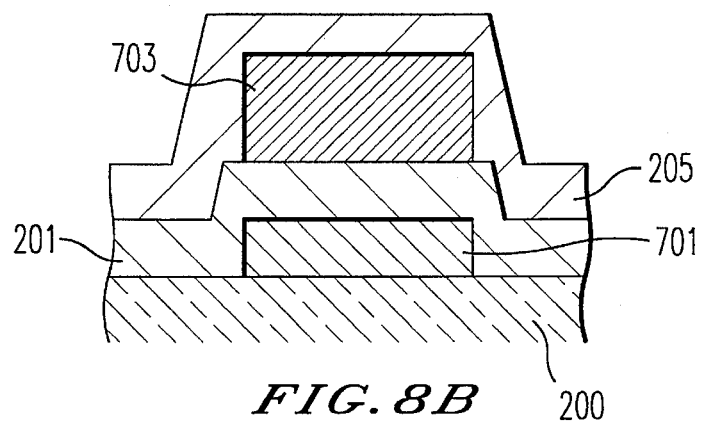
Figure 9:
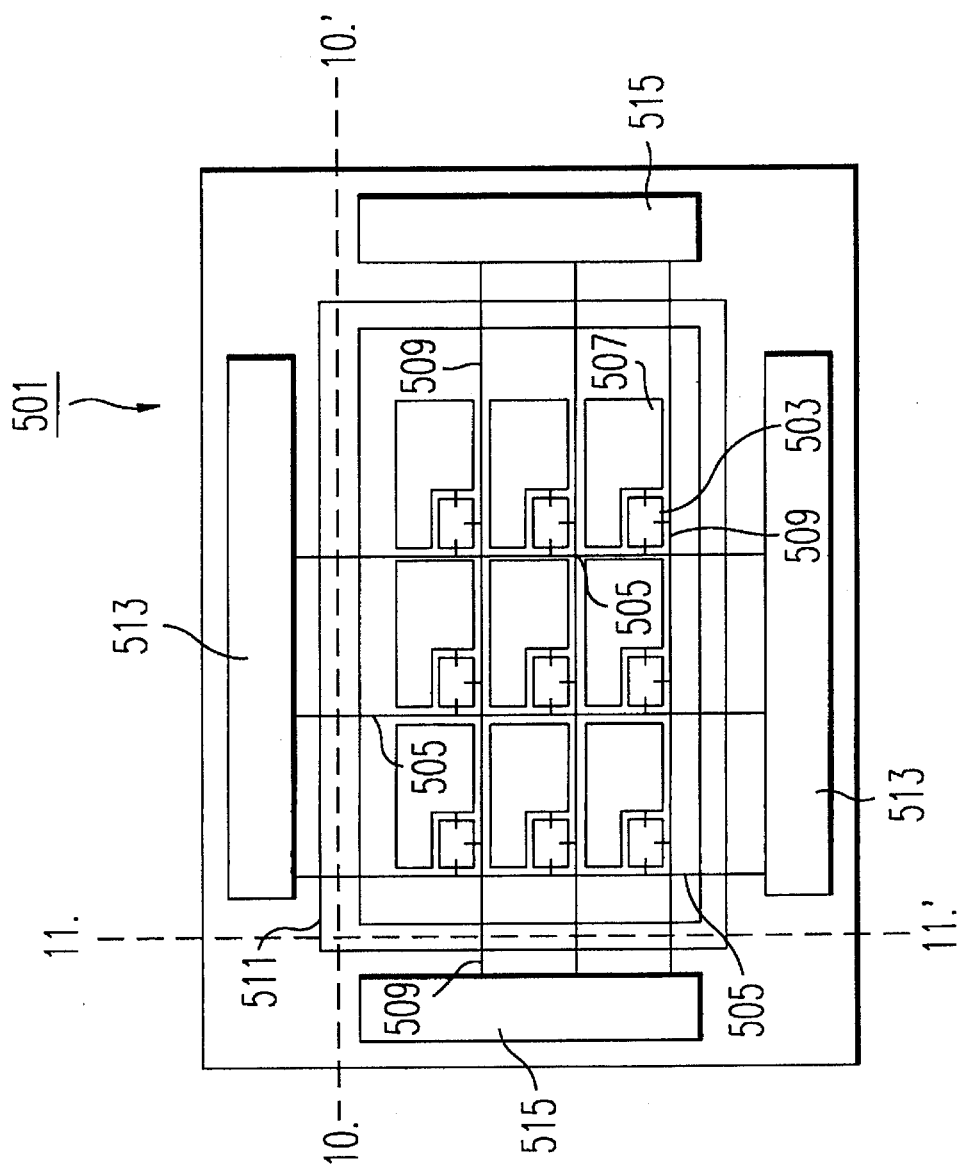
FIG. 9 is a schematic diagram showing a construction of a conventional liquid crystal display apparatus.
Figure 10:
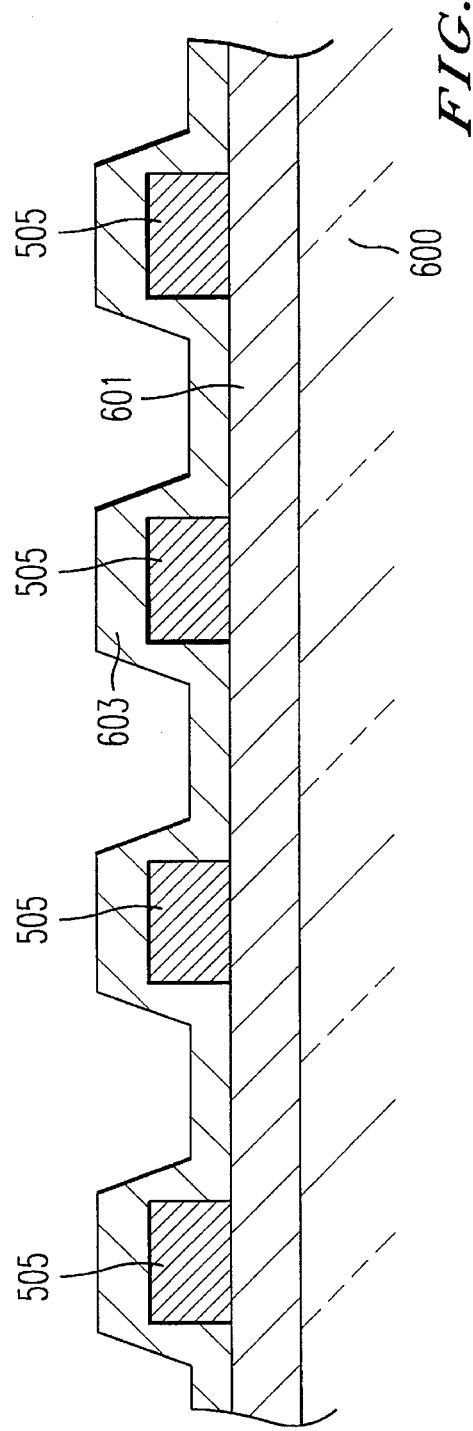
FIG. 10 is a sectional view showing a construction in the vicinity of lead portions of signal lines 505 of the conventional liquid crystal display apparatus.
Figure 11:
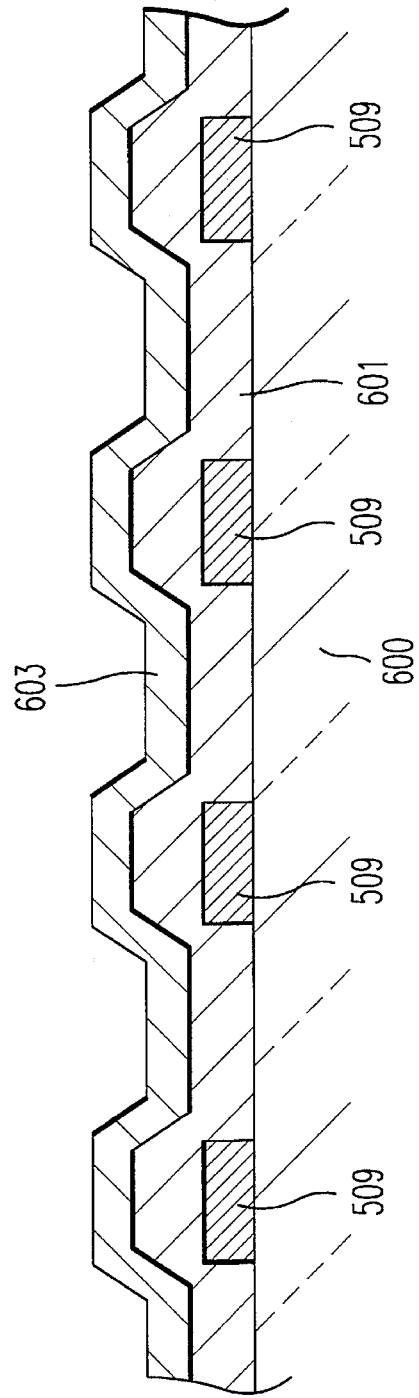
FIG. 11 is a schematic diagram showing a construction in the vicinity of lead portions of scanning lines 509 of the conventional liquid crystal display apparatus.

As shown in FIG. 8(b), each of the storage capacitors 35 is formed in the following manner. A lower electrode 701 that is the same layer as the scanning lines 9 and the gates 405 is formed over a substrate 200. The material of the lower electrode 701 is the same as the material of the scanning lines 9 and the gates 405. A layer insulating film 201, which is a dielectric layer, is formed over the lower electrode 701. An upper electrode 703 is formed over the dielectric layer 201. The material of the upper electrode 703 is the same as that of the signal lines 5 and the lead portions 13 thereof. Thus, the layer insulating film 201, which is a dielectric layer, is interposed between the upper electrode 703 and the lower electrode 701. A protecting film 205 is formed over the upper electrode 703 and the layer insulating film 201. When the principal portions of the storage capacitors 35 are formed with the materials of the liquid crystal display apparatus, the layer construction and the fabrication process can be preferably simplified.

The height of the storage capacitors 35 on the upper surface of the substrate 200 is the same as the height of the lead portions 18 of the storage capacitor lines 423. In other words, the layer construction and materials at the region of each of the lead portions 18 are the same as those of the storage capacitors 35, each of which is formed of the lower electrode 701, the layer insulating film 201, the upper electrode 703, and the protecting film 201. Unlike with the storage capacitors 35, the upper layer of each lead portion 18, which is formed of the same material with the same thickness as the upper electrode 703, is not connected to an outer power source. Thus, since the voltage of each lead portion 18 is in floating state, capacitance that is caused by drop, delay, or the like of current that flows the lead portions 18 can be almost ignored and thereby a display image displayed on the liquid crystal display apparatus is not substantially affected.

In this manner, the substrate gap on the lead portions 17 of the scanning lines 9 can be kept equal to the substrate gap on the lead portions 13 of the signal lines 5.

The constructions and materials of the fourth embodiment such as the scanning lines 9, the lead portions 17 thereof, the signal lines 5, the lead portions 13 thereof, the TFTs 3, the region covered with the sealing member 19, the scanning line driver circuits 15, and the signal line driver circuits 11 are almost the same as those of the first embodiment.

According to the fourth embodiment, since the gap between the two opposed substrates, which is cell gap of all the pixels, is kept equal, a high quality and high contrast display image can be obtained with this apparatus.

In this embodiment, the storage capacitors 35 were used to adjust the substrate gap in the substrate gap adjusting regions. However, the present invention is not limited to this construction. Instead, part or all of the signal line driver circuits 11 and the scanning line driver circuits 15 on the substrate 200 (namely, the signal line driver circuit 11 and the scanning line driver circuits 15 are incorporated with the substrate 200) are formed in the substrate gap adjusting region 33 covered by the sealing member 19 so that the substrate gap on the lead portions 13 of the signal lines 5 and the substrate gap on the lead portions 17 of the scanning lines 9 are kept equal.

With the above-described storage capacitors 35 formed in the substrate gap adjusting region 33, the height of the substrate gap on the lead portions 13 of the signal lines 5 is adjusted. In addition, the substrate gap adjusting layers 23, 25, and 29 according to the above-described first to third embodiments are formed on the lead portions 17 of the scanning lines 9 so as to adjust the substrate gap on the lead portions 17 of the scanning lines 9. Thus, the substrate gaps on both the sides can be equally adjusted. Moreover, the substrate gap adjusting layers 23, 25, and 29 may be formed both on the lead portions 17 of the scanning lines 9 and the lead portions 13 of the signal lines 5.

Thus, the gap between the two substrates in the substrate gap adjusting region 33 can be kept equal both in vertical and lateral directions of the surface of substrates.

According to the present invention, since the gap between two substrates can be equally kept in vertical and lateral directions by the substrate gap adjusting region and the substrate gap adjusting layers described in the above-mentioned embodiments, when the rigidity in the plane direction of the two substrates is satisfactorily large, a spacer that has been formed on the display region of the conventional liquid crystal display apparatus can be omitted. In the display region where the pixel electrodes are disposed, it is recommended not to place a member whose transmittivity is different from the liquid crystal regardless of whether the density of the member is low. Thus, according to the present invention, since the spacer can be omitted, the image quality is improved.

In the above-described first to fourth embodiments, so-called poly-Si TFTs, whose active layer was made of polysilicon, were used. However, it should be noted that the present invention can be applied to various constructions using crystal-Si TFTs, a-Si TFTs (as switching TFTs), stagger type TFTs, inverted-stagger type TFTs, two-terminal type devices such as MIM devices, or the like.

In addition, as with the switching TFTs, the scanning line driver circuits and the signal line driver circuits were formed of p-Si. However, only the driver circuits may be formed of crystal-Si. Or, for the driver circuits a liquid crystal display driver LSI may be mounted on a glass substrate, by COG (Chip On Glass) method.

A second sealing member that is different from the above-mentioned sealing member may be formed outside the driver circuits so as to protect the driver circuits from humidity, temperature change, and so forth, thereby improving durability of the driver circuits.

In the above-described embodiments, the opposed substrate was smaller than the outer size of the TFT array substrate. However, the present invention is not limited to this construction. When a plurality of liquid crystal display panels are formed on a large glass substrate, the outer size of the opposed substrate may be equal to or larger than the size of the TFT array substrate so as to simplify a scribe process performed after a liquid crystal layer is injected between the two opposed substrate.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

Industrial Applicability

As described above, according to the present invention, the gap between two opposed substrates (namely, cell gap) of a liquid crystal display apparatus can be kept equal at every pixel, thereby obtaining a high quality and high contrast display image.

We claim:

1. A liquid crystal display apparatus, comprising:

a switching element array substrate having switching elements, scanning lines, signal lines, storage capacitor lines and pixel electrodes, said scanning lines and said signal lines being coupled to said switching elements, said pixel elements being coupled to said switching elements, and said storage capacitor lines being arranged substantially parallel to the scanning lines and being overlapped with said pixel electrodes through an insulating layer so as to obtain storage capacitors;

a scanning line driver circuit coupled to said scanning lines;

a signal line driver circuit coupled to said signal lines;

an opposed substrate having a counter electrode being arranged opposite to said switching element array substrate with a gap in order to define a display region, said opposed substrate being bonded to said switching element array substrate with a sealing member formed in a sealing region around said display region; and an optical modulating layer formed at the gap between said switching element array substrate and said opposed substrate and sealed with said sealing member, wherein said switching element array substrate includes means for adjusting a first gap between a first region of said switching element array substrate and said opposed substrate to be equal a second gap between a second region of said switching element array substrate and said opposed substrate, said first region of said switching element array substrate being located under the sealing member and between the display region and the scanning line driver circuit, said second region of said switching element array substrate being located under the sealing member and between the display region and the signal line driver circuit, said storage capacitor lines being extended outside the display region through the first region of the switching element array substrate, and said adjusting means being arranged in said first region and formed of a conductive material of said signal lines.

2. The liquid crystal display apparatus according to claim 1, wherein said adjusting means are overlapped with at least one of said scanning lines and said storage capacitor lines.

3. The liquid crystal display apparatus according to claim 1, wherein said adjusting means are located along the direction of said scanning lines and said storage capacitor lines.

4. A liquid crystal display apparatus, comprising:

a switching element array substrate having switching elements, scanning lines, signal lines, storage capacitor lines and pixel electrodes, said scanning lines and said signal lines being coupled to said switching elements, said pixel elements being coupled to said switching elements, and said storage capacitor lines being arranged substantially parallel to the scanning lines and being overlapped with said pixel electrodes through an insulating layer so as to obtain storage capacitors;

a scanning line driver circuit coupled to said scanning lines;

a signal line driver circuit coupled to said signal lines;

an opposed substrate having a counter electrode being arranged opposite to said switching element array substrate with a gap in order to define a display region, said opposed substrate being bonded to said switching element array substrate with a sealing member formed in a sealing region around said display region; and an optical modulating layer formed at the gap between said switching element array substrate and said opposed substrate and sealed with said sealing member, wherein said switching element array substrate includes means for adjusting a first gap between a first region of said switching element array substrate and said opposed substrate to be equal a second gap between a second region of said switching element array substrate and said opposed substrate, said first region of said switching element array substrate being located under the sealing member and between the display region and the scanning line driver circuit, said second region of said switching element array substrate being located under the sealing member and between the display region and the signal line driver circuit, said storage capacitor lines being extended outside the display region through the first region of the switching element array substrate, and said adjusting means being arranged in said second region and formed of a conductive material of at least one of said scanning lines and said storage capacitor lines.

5. The liquid crystal display apparatus according to claim 4, wherein said adjusting means are overlapped with said signal lines.

6. The liquid crystal display apparatus according to claim 4, wherein said adjusting means are located along the direction of said signal lines.

7. A liquid crystal display apparatus, comprising:

a switching element array substrate having switching elements, scanning lines, signal lines, and pixel electrodes, said scanning lines and said signal lines being coupled to said switching elements, said pixel elements being coupled to said switching elements;

a scanning line driver circuit coupled to said scanning lines;

a signal line driver circuit coupled to said signal lines;

an opposed substrate having a counter electrode being arranged opposite to said switching element array substrate with a gap in order to define a display region, said opposed substrate being bonded to said switching element array substrate with a sealing member formed in a sealing region around said display region; and an optical modulating layer formed at the gap between said switching element array substrate and said opposed substrate and sealed with said sealing member, wherein said switching element array substrate includes means for adjusting a first gap between a first region of said switching element array substrate and said opposed substrate to be equal a second gap between a second region of said switching element array substrate and said opposed substrate, said first region of said switching element array substrate being located under the sealing member and between the display region and the scanning line driver circuit, said second region of said switching element array substrate being located under the sealing member and between the display region and the signal line driver circuit, and said adjusting means being arranged at least one of said first and second regions so as to electrically connect between said signal lines and said signal line driver circuit or between said scanning lines and said scanning line driver circuit.

8. A liquid crystal display apparatus, comprising:

a switching element array substrate having a substrate, switching elements, scanning lines, signal lines, storage capacitor lines and pixel electrodes, said scanning liens and said signal lines being coupled to said switching elements, said pixel elements being coupled to said switching elements, and said storage capacitor lines being arranged substantially parallel to the scanning lines and being overlapped with said pixel electrodes through an insulating layer so as to obtain storage capacitors;

a scanning line driver circuit coupled to said scanning lines;

a signal line driver circuit coupled to said signal lines;

an opposed substrate having a counter electrode being arranged opposite to said switching element array substrate with a gap in order to define a display region, said opposed substrate being bonded to said switching element array substrate with a sealing member formed in a sealing region around said display region; and an optical modulating layer formed at the gap between said switching element array substrate and said opposed substrate and sealed with said sealing member, wherein said switching element array substrate includes means for adjusting a first height from one surface of said substrate to a top surface in a first region of said switching element array substrate to be equal a second height from said one surface of said substrate to a top surface in a second region of said switching element array substrate, said first region of said switching element array substrate being located under the sealing member and between the display region and the scanning line driver circuit, said second region of said switching element array substrate being located under the sealing member and between the display region and the signal line driver circuit, said storage capacitor lines being extended outside the display region through the first region of the switching element array substrate, and said adjusting means being arranged in said first region and formed of a conductive material of said signal lines.

* * * * *

UNITED STATES PATENT AND TRADEMARK OFFICE
CERTIFICATE OF CORRECTION

PATENT NO. : 5,504,601
DATED : April 2, 1996
INVENTOR(S) : Yoshihiro WATANABE et al.

It is certified that error appears in the above-indentified patent and that said Letters Patent is hereby corrected as shown below:

On the title page, Item [54], and in Column 1, lines 1-4, the title is incorrect. Also on the title page, Item [87], the PCT publishing date is incorrect. The corrections should read:

--[54] LIQUID CRYSTAL DISPLAY APPARATUS WITH GAP ADJUSTING LAYERS LOCATED BETWEEN THE DISPLAY REGION AND DRIVER CIRCUITS--

--[87] PCT Pub. No.: WO94/02880

PCT Pub. Date: Feb. 3, 1994--

Signed and Sealed this

Thirtieth Day of July, 1996

Attest:

BRUCE LEHMAN

*Attesting Officer*     *Commissioner of Patents and Trademarks*

UNITED STATES PATENT AND TRADEMARK OFFICE
CERTIFICATE OF CORRECTION

PATENT NO. : 5,504,601
DATED : April 2, 1996
INVENTOR(S) : WATANABE et al.

It is certified that error appears in the above-indentified patent and that said Letters Patent is hereby corrected as shown below:

In column 1, line 24, change "is" to --are--.

In column 4, line 21, after "equal" insert --to--;
line 45, after "equal" insert --to--.

In column 6, line 49, change "With" to --with--.

In column 7, line 25, change "signal .lines" to --signal lines--.

In column 9, line 2, after "serves" insert --as--;
same line, before "sealing" insert --a--;
line 24, change "fours" to --hours--.

In column 13, line 17, after "example," insert --materials--.

UNITED STATES PATENT AND TRADEMARK OFFICE
CERTIFICATE OF CORRECTION

PATENT NO. : 5,504,601
DATED : April 2, 1996
INVENTOR(S) : WATANABE et al.

Page 2 of 2

It is certified that error appears in the above-indentified patent and that said Letters Patent is hereby corrected as shown below:

In column 14, line 17, before "be" insert --may--.

In column 16, line 17, change "of all" to --all of--.

In column 18, line 22, change "substrate" to --substrates--.

In column 20, line 43, change "liens" to --lines--.

Signed and Sealed this

First Day of April, 1997

Attest:

BRUCE LEHMAN

Attesting Officer

Commissioner of Patents and Trademarks